(12) United States Patent
Sun

(10) Patent No.: US 8,797,983 B2
(45) Date of Patent: Aug. 5, 2014

(54) APPARATUSES AND METHODS FOR ALLOCATING SPECTRUM RESOURCES IN A WIRELESS COMMUNICATION NETWORK

(75) Inventor: Ying Sun, Sundbyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 136 days.

(21) Appl. No.: 13/343,992

(22) Filed: Jan. 5, 2012

(65) Prior Publication Data

US 2013/0176949 A1   Jul. 11, 2013

(51) Int. Cl.
*H04W 4/00*   (2009.01)

(52) U.S. Cl.
USPC ............................................ 370/329; 370/348

(58) Field of Classification Search
USPC ............... 455/452.1, 509, 450; 370/431, 252, 370/329, 311, 328, 395.4
See application file for complete search history.

(56) References Cited

U.S. PATENT DOCUMENTS

2005/0180427 A1* 8/2005 Eriksson et al. ........... 370/395.4
2005/0288030 A1* 12/2005 Choi et al. .................... 455/450
2010/0238863 A1* 9/2010 Guo et al. ..................... 370/328
2010/0303022 A1  12/2010 Maas et al.
2011/0128921 A1   6/2011 Ray et al.
2011/0310758 A1* 12/2011 Tamaki et al. ................ 370/252

FOREIGN PATENT DOCUMENTS

WO     2009061778 A1    5/2009

* cited by examiner

*Primary Examiner* — Andrew Lai
*Assistant Examiner* — Jamaal Henson
(74) *Attorney, Agent, or Firm* — Rothwell, Figg, Ernst & Manbeck PC

(57) ABSTRACT

Methods for allocating spectrum resources among a plurality of devices in a wireless communication network are disclosed. In one aspect, an estimated number of resource blocks required by a first device and an estimated number of resource blocks required by a second device are determined. The required number of resource blocks may be determined by considering the number of resource blocks that would be necessary to empty the buffer of a first device and/or determining the number of resource blocks that would be sufficient to cause the first device to become power limited. These estimates may then be used to calculate first and second utilization weights, which can in turn be used to calculate scheduling entity weights for a plurality of scheduling entities, such as UEs in the communication network. Allocation may be based on the scheduling entity weights, utilization weights, and/or the required number of resource blocks.

18 Claims, 16 Drawing Sheets

|  | 1 | 2 | 3 | 4 | 5 | 6 | 8 | ... | 100 |
|---|---|---|---|---|---|---|---|---|---|
| -5 | $\varepsilon_{1,1}$ | . | . | . | . | . | . | . | . |
| -6 | $\varepsilon_{1,2}$ | . | . | . | . | . | . | . | . |
| -7 | . | . | . | . | . | . | . | . | . |
| -8 | . | . | . | . | $\varepsilon_{m,m}$ | . | . | . | . |
| . | . | . | . | . | . | . | . | . | . |
| . | . | . | . | . | . | . | . | . | . |
| . | . | . | . | . | . | . | . | . | . |
| 20 | . | . | . | . | . | . | . | . | . |
| 21 | . | . | . | . | . | . | . | . | $\varepsilon_{n,n}$ |

FIG. 9

APPARATUSES AND METHODS FOR ALLOCATING SPECTRUM RESOURCES IN A WIRELESS COMMUNICATION NETWORK

TECHNICAL FIELD

The present invention relates generally to wireless communication networks, and more particularly, to a method and apparatus for allocating spectrum resources to one or more users of the network.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. As illustrated in FIG. 1, LTE transmissions are sent from base stations 102, such as Node Bs (NBs) and evolved Node Bs (eNBs) in a telecommunications network 104, to mobile stations 106,108 (e.g., user equipment (UE)).

The LTE standard is primarily based on Orthogonal Frequency Division Multiplexing (OFDM) in the downlink, which splits the signal into multiple parallel sub-carriers in frequency, and Single Carrier Frequency Domain Multiple Access (SC-FDMA) in the uplink.

As illustrated in FIG. 2, a sub-frame 200 may be transmitted in accordance with the LTE standard, and may consists of 12 or 14 sub-carriers 204 in the frequency domain. In the time domain, the sub-frame may be divided into a number of OFDM (or SC-FDMA) symbols 208. An OFDM (or SC-FDMA) symbol 208 may include a cyclic prefix 206. A unit of one sub-carrier and one symbol is referred to as a resource element (RE) 202. Thus, a sub-frame may consist of, for example, 84 REs in a 12×7 configuration as shown in FIG. 2.

Currently, LTE does not support dedicated data channels; rather, shared channel resources are used in both the downlink and uplink transmissions. These shared resources, Downlink Shared Channel (DL-SCH) and Uplink Shared Channel (UL-SCH), are each controlled by a single scheduler that assigns different parts of the downlink and uplink shared channels to different scheduling entities (e.g., UEs) for reception and transmission, respectively. These schedulers are in full control of in which sub-frame a UE should receive on DL-SCH, or is allowed to transmit on UL-SCH. Scheduling decisions are sent to each UE as downlink assignments and uplink grants. Downlink assignment information and uplink grants may be transmitted as Downlink Control Information (DCI), for instance, using L1/L2 control signaling.

For an uplink (UL) transmission, the portion of the bandwidth assigned to one UE is always a set of contiguous scheduling blocks (SBs) due to the single carrier constraint imposed by the SC-FDMA transmission scheme. These assigned bandwidth resources are indicated in the DCI by a start-SB and an allocation size, which is provided as a number of SBs. LTE currently supports full dynamic scheduling; therefore, the particular bandwidth resource assignment to a UE is only valid for one sub-frame. In the next sub-frame, the same bandwidth resources may be re-assigned, for instance, to another UE.

An exemplary UL scheduling result for three scheduling entities is provided in FIG. 3. The three sub-frames 302 illustrate potential scheduling results that are possible using dynamic scheduling. For instance, multiple users may share different parts of the available frequency resources within a single sub-frame, as shown by sub-frame n. Alternatively, all of the frequency resources of a sub-frame may be assigned to one user (sub-frame n+1). Similarly, no users are allocated any frequency resources within sub-frame n+2. In the illustration of FIG. 3, the available bandwidth is reduced by four SBs 304 in each sub-frame, which are occupied by uplink L1/L2 control signaling.

Presently, resource allocation depends on the properties of the user population in the system, e.g., the number of users, their traffic models and radio channel characteristics, as well as the algorithm implementing the scheduling functionality. The strategy that defines the manner in which resources in the time and frequency domains are allocated to a set of users is commonly referred to as a scheduling algorithm.

Scheduling strategies may be accomplished by scheduling algorithms in either the time domain or frequency domain. Time domain scheduling strategies include, for example, Round Robin, Proportional Fair, or delay based. Frequency domain scheduling strategies may include Resource Fair and Frequency Selective scheduling. For instance, allocation may be optimized based on knowledge of the candidate UEs or known channel quality parameters, where devices with low channel quality may receive a larger allocation.

Certain scheduling algorithms are tailored to maximize spectrum efficiency independent of end user behavior, such as the end user's Quality of Service (QoS) class, the traffic model, etc. In a typically system, there may be many users with varied traffic properties. For instance, some users have little data to transmit, while some users are limited by their maximum transmit power in the uplink. These users cannot fully utilize the spectrum with high efficiency.

For users that have both a full buffer of transmit data and good radio conditions, acceptable spectrum utilization and efficiency can be achieved based on present technologies. However, there is a need for systems and methods to schedule different types of users with varied amounts of data and transmission properties such that both high spectrum efficiency and good end-user performance may be achieved.

SUMMARY

Particular embodiments of the present invention are directed to devices and methods for allocating spectrum resources among a plurality of users based on required resource predictions and utilization weights in order to maximize spectrum efficiency while maintaining high quality end-user performance.

In one particular aspect, a scheduling method for allocating spectrum resources among a plurality of devices in a wireless communication network includes determining the estimated number of resource blocks ($N_{RB1}$) required by a first device and the estimated number of resource blocks ($N_{RB2}$) required by a second device. A first utilization weight, associated with the first device, is then calculated using $N_{RB1}$. Similarly, a second utilization weight, associated with the second device, is calculated using $N_{RB2}$. The method further includes allocating spectrum resources among the first and second devices based on the first and second utilization weights. According to particular embodiments of the present invention, the method further includes calculating a scheduling entity weight for each device and prioritizing the device with the greater scheduling entity weight when allocating spectrum resources.

In some embodiments, the step of determining $N_{RB1}$ further includes determining the number of resource blocks that would be necessary to empty the buffer of the first device and determining the minimal number of resource blocks that would be sufficient to cause the first device to become power limited. It is then determined if the number of resource blocks necessary to empty the buffer of the device is less than the number of resource blocks sufficient to cause the device to become power limited. If so, $N_{RB1}$ is set equal to the number of resource blocks necessary to empty the buffer. If the number of resource blocks necessary to empty the buffer of the device is not less than the number of resource blocks sufficient to cause the device to become power limited, $N_{RB1}$ may be set to the product of a multiplier and the number of resource blocks necessary to cause the device to become power limited. In certain embodiments of the present invention, $N_{RB1}$ may also be set equal to the determined number of resource blocks sufficient to cause the first device to become power limited.

Particular embodiments provide a scheduling node for allocating spectrum resources among a plurality of devices in a wireless communication network, which includes a transmitter and a data processor coupled to the transmitter. The processor is configured to determine the estimated number of resource blocks ($N_{RB1}$) required by a first device and the estimated number of resource blocks ($N_{RB2}$) required by a second device. The processor is further configured to calculate a first utilization weight, associated with the first device, using $N_{RB1}$. Similarly, a second utilization weight, associated with the second device, is calculated using $N_{RB2}$. The processor is also configured to allocate spectrum resources among the first and second devices based on the first and second utilization weight. According to particular embodiments of the present invention, the processor is configured to calculate a scheduling entity weight for the first and second device and the allocation of spectrum resources includes prioritizing the devices based on which device has the greater scheduling entity weight.

In some embodiments, the processor is further configured to determine $N_{RB1}$ by calculating the number of resource blocks that would be necessary to empty a buffer of the first device and calculating the minimum number of resource blocks that would be sufficient to cause the first device to become power limited. The processor then determines if the number of resource blocks necessary to empty the buffer of the device is less than the number of resource blocks sufficient to cause the device to become power limited. If so, the processor is configured to set $N_{RB1}$ equal to the number of resource blocks necessary to empty the buffer. If the number of resource blocks necessary to empty the buffer of the device is not less than the number of resource blocks sufficient to cause the device to become power limited, $N_{RB1}$ may be set to the product of a multiplier and the minimum number of resource blocks that would be sufficient to cause the device to become power limited. In certain embodiments of the present invention, the processor may also be configured to set $N_{RB1}$ equal to the calculated number of resource blocks that would be sufficient to cause the first device to become power limited.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 9 is a table used for calculating approximation correction values in accordance with exemplary embodiments of the present invention.

DETAILED DESCRIPTION

Particular embodiments of the present invention are directed to a scheduling node and methods for scheduling that allocate spectrum resources among a plurality of users based on required resource predictions and utilization weights in order to accomplish one or more allocation goals, such as maximizing spectrum efficiency.

In one particular aspect, a scheduling method for allocating spectrum resources among a plurality of devices in a wireless communication network includes determining the estimated number of resource blocks required by a first device and the estimated number of resource blocks required by a second device. The required number of resource blocks may be determined by considering the number of resource blocks that would be necessary to empty the buffer of a first device and/or determining the number of resource blocks that would be sufficient to cause the first device to become power limited. These estimates may then be used to calculate first and second utilization weights, which can in turn be used to calculate scheduling entity weights for a plurality of scheduling entities, such as UEs in the communication network.

Spectrum resources may be allocated among a plurality of scheduling entities based, at least in part, on the calculated scheduling entity weights. For instance, a device with the highest average scheduling entity weight in a given frequency range may be prioritized when allocating spectrum resources. This allows for unused physical resource blocks (PRBs) to be grouped with a neighboring PRB group. Accordingly, different types of scheduling entities with varied amounts of data and transmission properties may be scheduled such that both good spectrum efficiency and good end-user performance may be achieved.

Figure 1:
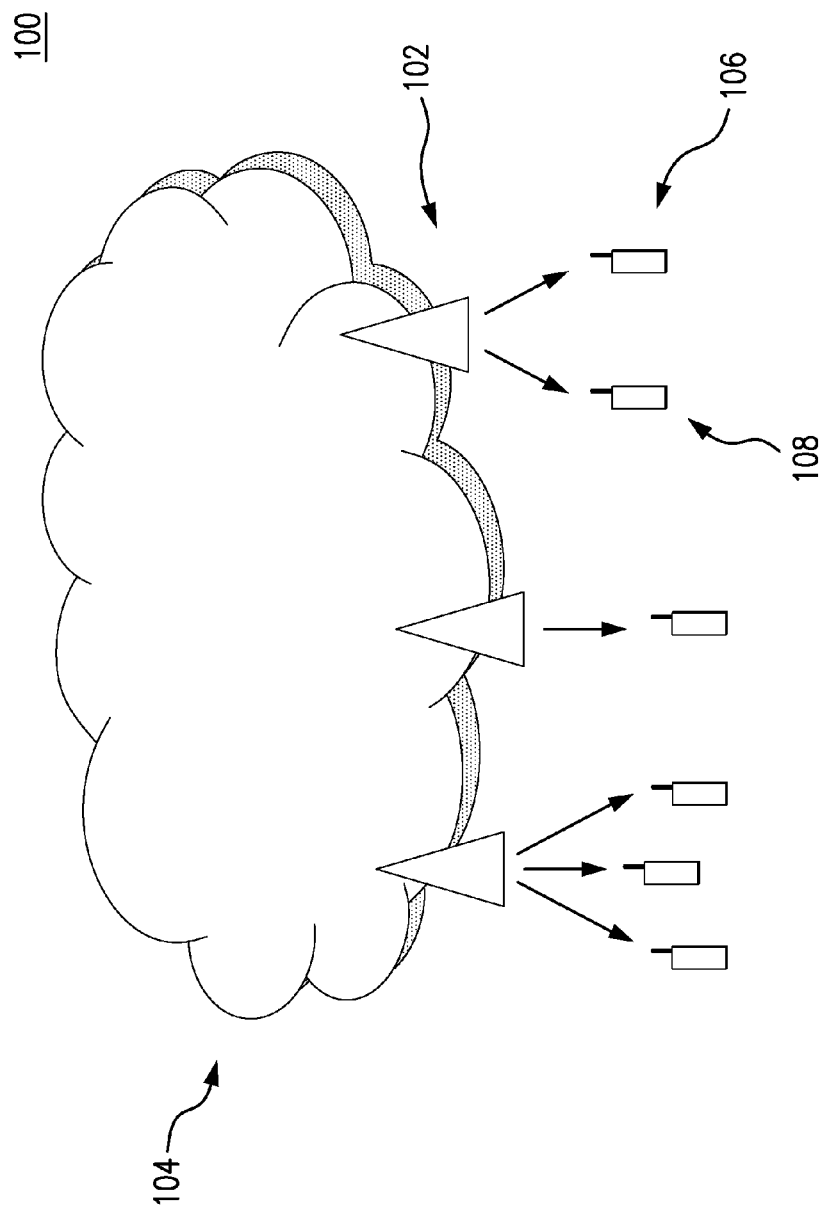
FIG. 1 is an illustration of a wireless communication system.
Figure 2:
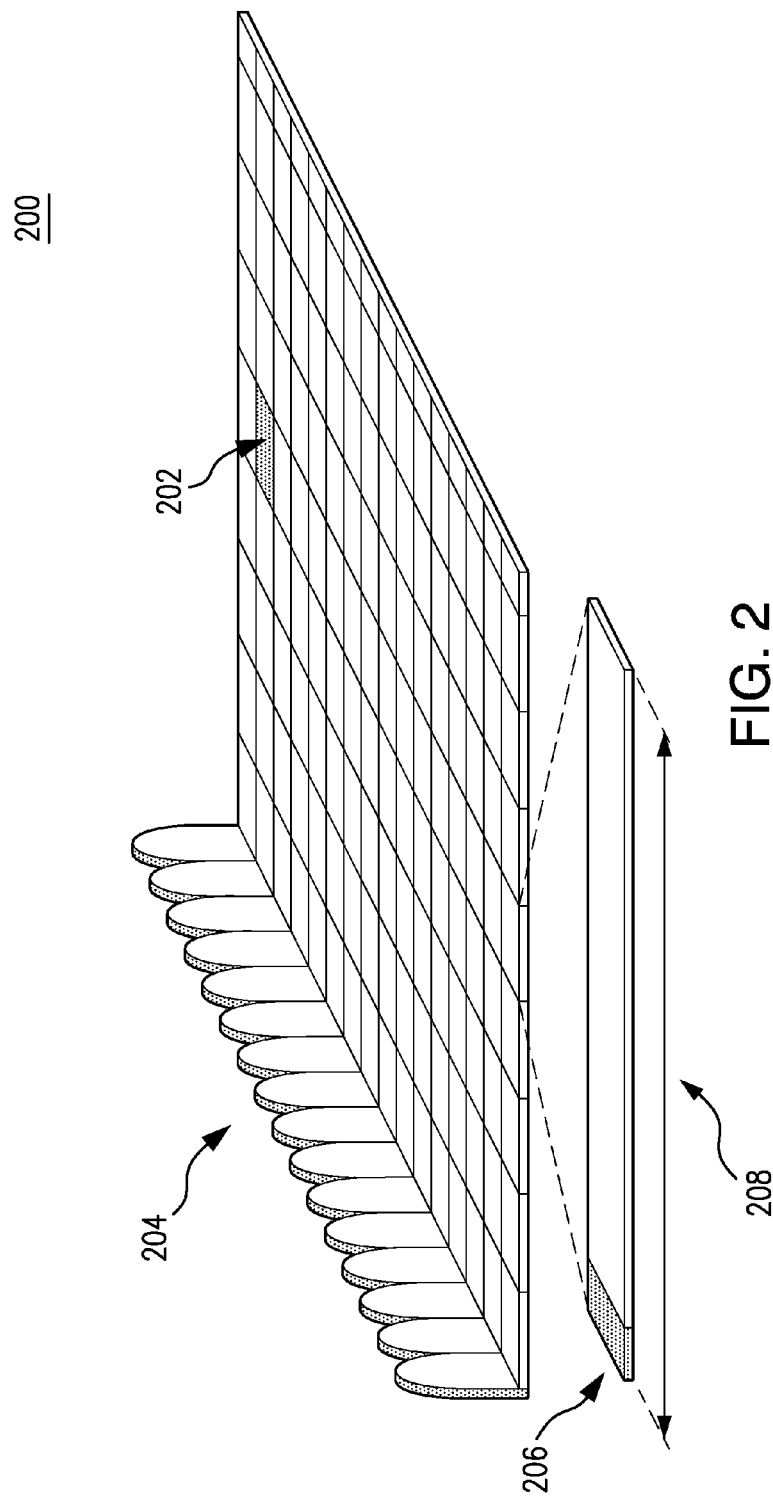
FIG. 2 illustrates an exemplary sub-frame.
Figure 3:
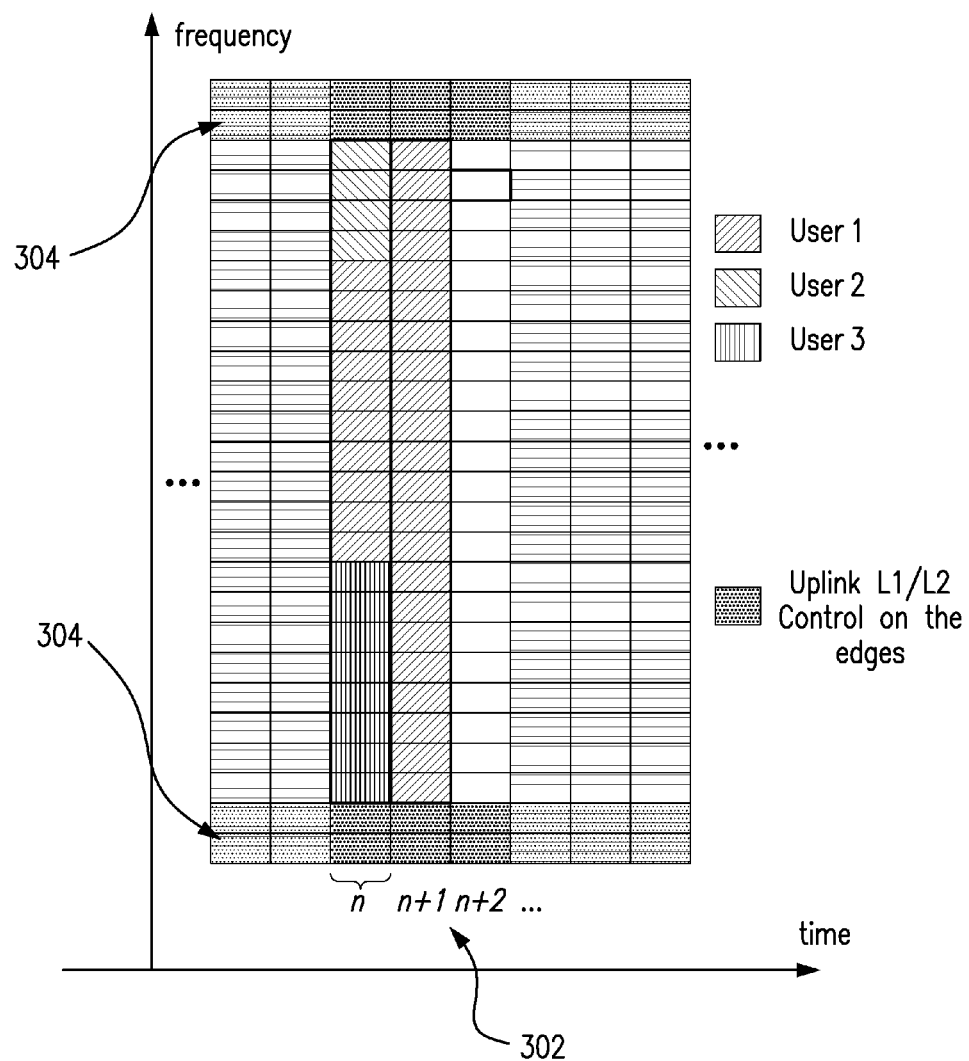
FIG. 3 illustrates an exemplary allocation of spectrum resources.
Figure 4:
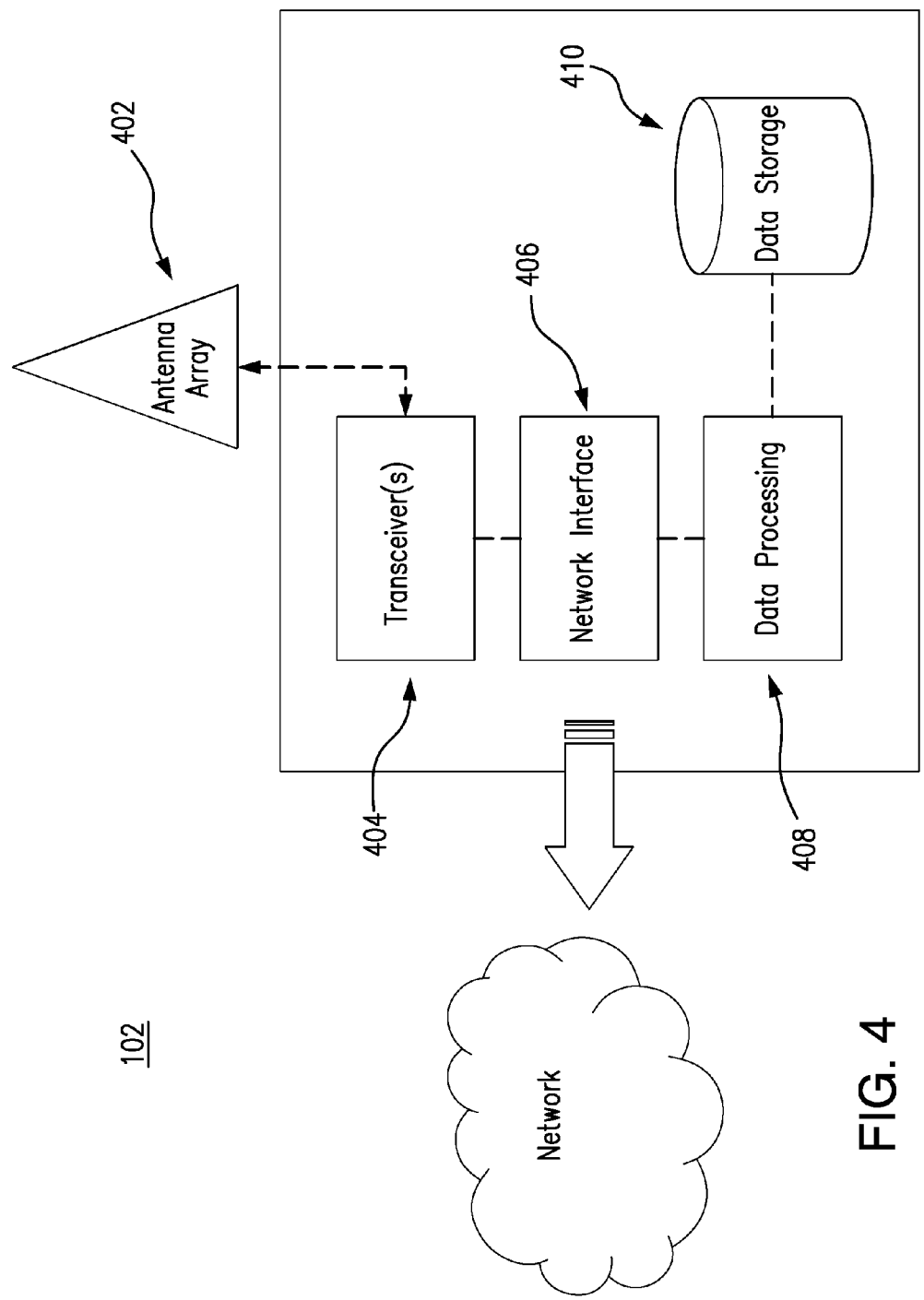
FIG. 4 is a block diagram of a base station in accordance with exemplary embodiments of the present invention.

FIG. 4 illustrates a block diagram of an exemplary base station 102. As shown in FIG. 4, the base station 102 may include: a data processing system 408, which may include one or more microprocessors and/or one or more circuits, such as an application specific integrated circuit (ASIC), field-programmable gate arrays (FPGAs), and the like; a network interface 406; and a data storage system 410, which may include one or more non-volatile storage devices and/or one or more volatile storage devices (e.g., random access memory (RAM)). The network interface 406 is connected to transceiver 404, which is configured to transmit and receive signals via an antenna array 402 and may include one or more receivers or transmitters. In an exemplary embodiment of the disclosed devices and methods, the base station 102 is a Node B or Evolved Node B.

In embodiments where data processing system 408 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 408 to perform steps described below (e.g., steps described below with reference to the flow charts shown in FIGS. 5 and 6). In other embodiments, the base station 102 is configured to perform steps described below without the need for code. That is, for example, data processing system 408 may consist merely of one or more ASICs. Hence, the features of the present invention described above may be implemented in hardware and/or software. For example, in particular embodiments, the functional components of the base station described above may be implemented by data processing system 408 executing computer instructions, by data processing system 408 operating independent of any computer instructions, or by any suitable combination of hardware and/or software.

Figure 5:
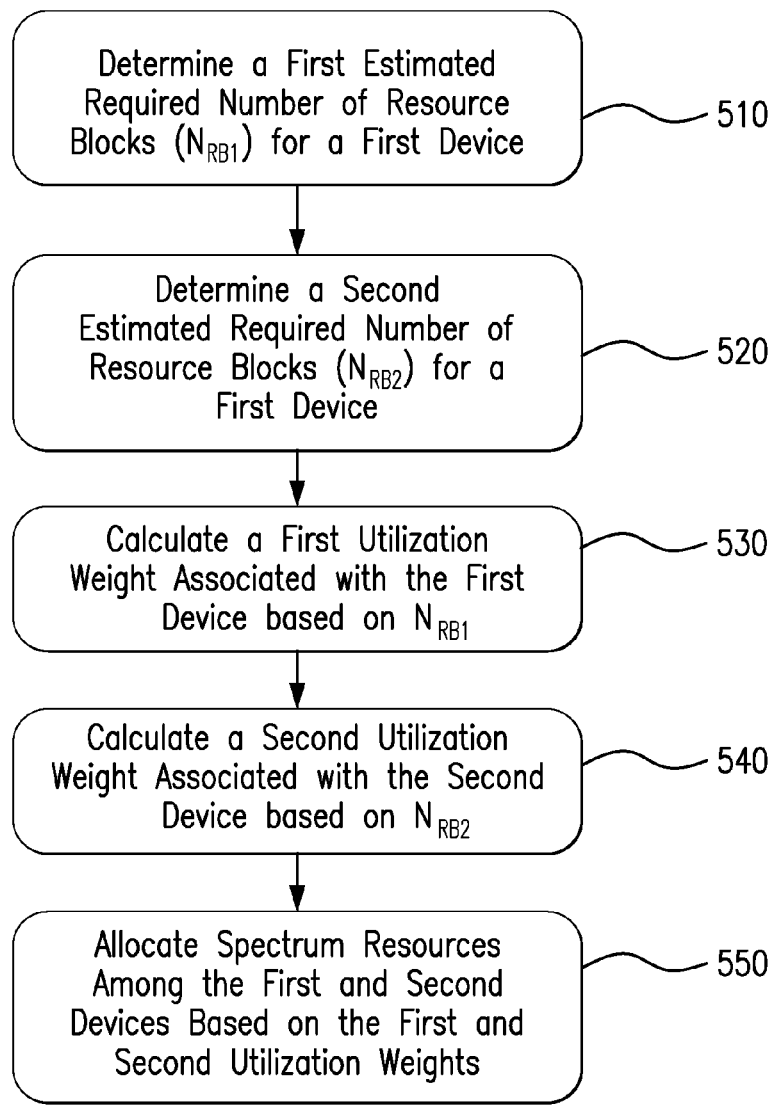
FIG. 5 is a flow chart illustrating a process for allocating spectrum resources in accordance with exemplary embodiments of the present invention.

Referring to FIG. 5, a flow chart is provided, which illustrates a process 500 for allocating spectrum resources amongst a plurality of user devices in a wireless communication network.

Process 500 may begin at step 510, where the estimated number of resource blocks (or scheduling blocks) required by a first scheduling entity, $N_{SB,required}$, is determined. The scheduling entity may be, for example, a user device UE 106,108. The value of $N_{SB,required}$ is determined by estimating the number of required scheduling blocks the scheduling entity may need under certain operating conditions, such as, the estimated number of required scheduling blocks when the scheduling entity is power limited, or becomes buffer limited.

According to certain embodiments, the determining step 510 includes finding the Transport Block Size, $TBS_{approx}$, corresponding to the number of scheduling blocks for which the scheduling entity becomes power limited, $N_{SB,pwrLimited}$. For a given maximum power, the value of $N_{SB,pwrLimited}$ may represent the most spectrum efficient operation point. Specifically, if the allocation that the scheduling entity is granted is larger than $N_{SB,pwerLimited}$, the Power Spectral Density (PSD) received by the base station 102 would be lower than the desired PSD, $PSD_{target}$. As such, spectrum efficiency would be reduced.

According to certain aspects of the present invention, the value of $N_{SB,pwrLimited}$ may be determined based on information received from the scheduling entity, such as a Power Headroom Report (PHR). For example, the number of allocated scheduling blocks that would cause a given UE to become power limited may be given by:

$$N_{SB,pwrLimited}=10^{\wedge}(P_{max}-PSD_{TX,target}-cIPccSum)/10) \quad (I)$$

where $PSD_{TX,target}$ is the estimated transmit PSD target for the most recent PHR; $P_{max}$ is the maximum transmit power in dBm; and cIPccSum is the sum of the power control commands transmitted since the last power headroom report was received. Both $PSD_{TX,target}$ and $P_{max}$ may be determined based on the received PHR, which indicates the difference between a scheduling entity's maximum power and actual power. For instance the estimated transmit target PSD may be given by:

$$PSD_{TX,target}=PSD_{rx,target}+\text{Estimated Pathloss} \quad (II)$$

where $P_{rx,target}$ is the received PSD target in dBm. This value may be defined, for example, by the base station 102, such as an eNB, and signaled to the UE.

As part of the determination of $N_{SB,required}$, a wideband Signal to Interference-plus-Noise Ratio (SINR) may be calculated based on the average interference per resource block by assuming that the UE is not power limited, as follows:

$$SINR_{wideband}=PSD_{rx,target}-I_{avg} \quad (III)$$

where $I_{avg}$ is the measured average interference-plus-noise PSD over the entire spectrum. Also assuming that the UE is not power limited, $TBS_{approx}$ may be calculated through transport format selection. Specifically, the Transport Block Size (TBS) and Modulation Coding Scheme (MCS) may be calculated using a Raw Bit Information (RBI) table based on calculated values of $N_{SB,pwrLimited}$ and SINR.

Figure 7:
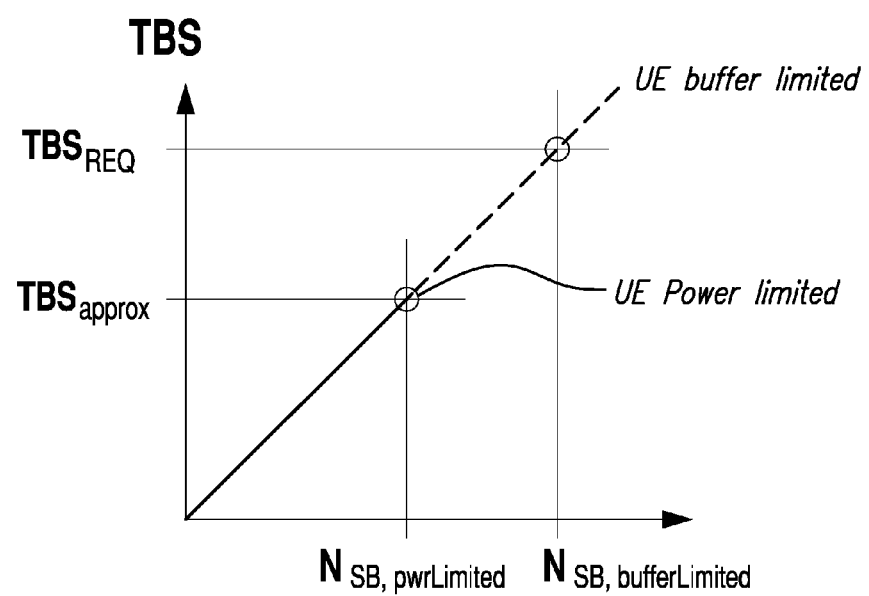
FIG. 7 is an illustration of required resource block approximation.

The number of scheduling blocks that would cause the scheduling entity to become buffer limited, $N_{SB,bufferLimited}$, is also determined as part of step 510, according to certain aspects of the present invention. This value represents the number of scheduling blocks that are needed to fully empty the first scheduling entity's buffer, assuming that the PSD target is reached, i.e., that the UE is not power limited. This value may be determined based on power limited estimates of the scheduling entity, such as $TBS_{approx}$ and $N_{SBpwrLimited}$, which were determined previously. For instance, an approximation process for determining $N_{SB,required}$ is illustrated in FIG. 7, wherein the required number of scheduling blocks is determined to be the minimum value of N.

According to certain embodiments of the present invention, $N_{SB,bufferLimited}$ my be determined based on the following:

$$N_{SB,bufferLimited}=TBS_{req}/TBS_{approx}*N_{SBpwrLimited} \quad (IV)$$

where $TBS_{req}$ is the buffer estimate for the given scheduling entity. $TBS_{req}$ may be determined based on a received Buffer Status Report, which indicates the amount of data in a UE's buffer. For instance, $TBS_{req}$ may be the difference between the value received from a Buffer Status Report and the value of the data grants that have been issued to the reporting UE since the most recent report. The value of the grants may be, for example, the accumulated value of all data grants sent within a given round trip time (RTT).

According to certain embodiments, the scheduling entity may belong to multiple carriers. In this instance, $SINR_{wideband}$, $TBS_{approx}$, and $N_{SB,bufferLimited}$ are vectors that represent the average channel quality in the different carriers.

A scheduling node, for instance base station 102, which includes data processor 408, then calculates the required number of scheduling blocks that can be allocated to a given scheduling entity in a Transmit Time Interval (TTI). This may be based, at least in part, on the resource allocation strategy that is applied to the scheduling entity and/or the number of valid scheduling entities to be scheduled. For instance, a resource allocation strategy could implement the following rules:

If $N_{SB,bufferLimited} < N_{SB,pwrLimited}$:
 $N_{SB,required} = N_{SB,bufferLimited}$
Else If the resource allocation strategy is based on maximizing bits/Hz and the number of available scheduling entities is greater than 1:

$$N_{SB,required} = N_{SB,powerLimited}$$
Else
$$N_{SB,required} = \epsilon \cdot N_{SB,powerLimited}$$

where $\epsilon$ is an SINR dependent approximation parameter.

According to an embodiment of the present invention, $\epsilon$ may be a subband correction factor that is computed based on the number of scheduling blocks, $N_{SB,ref}$, that correspond to the situation where the UE has the highest spectrum efficiency, and $N_{SB,pwrLimited}$, the number of scheduling blocks that corresponds to the situation where the UE is power limited. For example, $\epsilon$ may be defined as $$\epsilon = N_{SB,ref} / N_{SB,pwrLimited} \qquad (V)$$

The value of $\epsilon$ may depend on a reference SINR value, $SINR_{ref}$, as well as $N_{SB,pwrLimited}$. $SINR_{ref}$ may range, for example, from −5 dB to 30 dB. $N_{SB,ref}$ can be determined through offline simulations applying a link adaptation function. These simulations can result in a two-dimensional table, for instance, as shown in FIG. 9.

According to aspects of the present invention, the value of $N_{SB,ref}$ may be determined based on the following rules:

```
For SINR_ref(i)∈[−5db,30db]
    For N_SB,pwrLimited(j)∈[1,100],
        TBS/N_sbmax = 0
        For N_SB(k) ∈[1,100]
            Compute SINR(k,j,i) based on
            SINR_ref(i), N_SB,pwrLimited(j) and N_SB(k),
            where SINR(k,j,i)=SINR_ref(i)/ N_SB(k)
            *N_SB,pwrLimited(j)
            Call Link adaptation function to
            compute TBS(i,j,k) with input
            SINR(k,j,i) and N_SB(k)
            If TBS(i,j,k) / N_SB(k) > TBS/N_sbmax
                TBS/N_sbmax =TBS(i,j,k) / N_SB(k);
                N_SB,ref(i,j) = N_SB(k);
                ϵ(i,j)= N_SB,ref(i,j) / N_SB,pwrLimited(j)
            End if
        End for
    End for
End for
```

In step 520, the estimated number of scheduling blocks required by a second scheduling entity, $N_{SB,required\_2}$, is determined. This may be accomplished, for example, by repeating the steps outlined above.

In step 530, a first utilization weight, is calculated based on $N_{SB,required}$. This weight is associated with the first scheduling entity.

The utilization weight of a particular scheduling entity $W_{utility}(i)$ may be given by $$W_{utility}(i) = f(U_i) \qquad (VI)$$

where $U_i$ is a ratio between allocation group size and the required number of resource blocks. For instance, $U_i$ may be defined as $$\log(N_{SB,max}/N_{SB,required}(i)) \qquad (VII)$$

where $N_{SB,max}$ is the maximum allocation size approximation for the scheduling entity i. Accordingly, the value of $W_{utility}(i)$ may be positive or negative depending on the applied function and relative sizes of $N_{SB,max}$ and $N_{SB,required}$. This allocation size approximation is performed prior to actual allocation and may be understood as the resource budget that the scheduling node allows the scheduling entity to occupy when the spectrum resources are limited. This value may be determined based on the applied allocation strategy. For instance, the scheduling node may define the maximum allocation size approximation by partitioning the available spectrum into groups of consecutive scheduling blocks called "islands." The maximum allocation size approximation would then correspond to the number of scheduling blocks in a single island.

Figure 8:
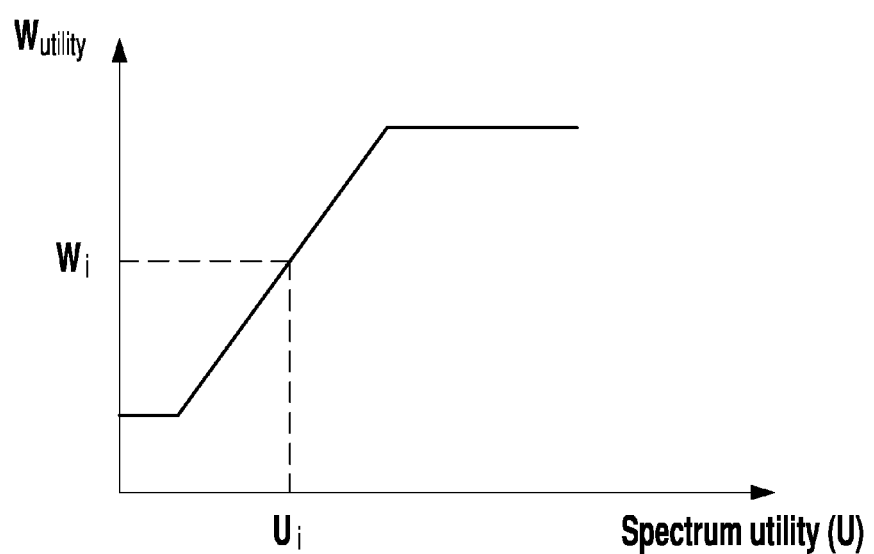
FIG. 8 is a plot of a resource utilization weight function in accordance with exemplary embodiments of the present invention.

According to certain embodiments, the utility weight function "f( )" shown in Equation (VI) may be defined as shown in FIG. 8.

In step 540, a second utilization weight, is calculated based on $N_{SB,required\_2}$. This weight is associated with the second scheduling entity and may be calculated as detailed above with respect to the first utilization weight.

In step 550, spectrum resources are allocated between the first and second device. This allocation is based on the utilization weights, which are based on the estimated required number of resource blocks that each device will need. For instance, the device with the higher utilization weight or smaller estimated number of required resource blocks may be scheduled first. Reordering of allocation based on utilization weight or estimated required blocks can thus improve spectrum efficiency. For example, a scheduling entity with poor radio conditions or with a small amount of data may be allocated first, such that the unused resource blocks may then be used for a second (or third) scheduling entity with a larger buffer or better radio conditions. In this example, the device with the largest estimated required number of resource blocks may be scheduled last. Moreover, the above-identified techniques may be coupled with an inter-cell interference coordination (ICIC) scheduler, such that power limited scheduling entities may be separated in frequency to improve cell edge scheduling entity throughput.

According to certain aspects of the present invention, a process for allocating spectrum resources may also include the determination of one or more scheduling weights. A first scheduling entity weight, which is associated with the first device, may be calculated based on the first utilization weight. The first scheduling weight may be calculated, for example, based on time domain parameters, frequency domain parameters, or a combination of both, as described below with reference to FIG. 6. For instance, a scheduling weight may be derived based on one or more of a bit rate metric, priority configurations, delay budget, channel quality representations, gain to interference plus noise ratio (GINR), and the resource utilization weight discussed above. The parameters may be specific to a particular application or scheduling algorithm. Similarly, a second scheduling entity weight, which is associated with the second device, may be calculated based on the second utilization weight. A scheduling weight may be calculated for each of the devices that will be scheduled by the scheduling node.

Figure 6:
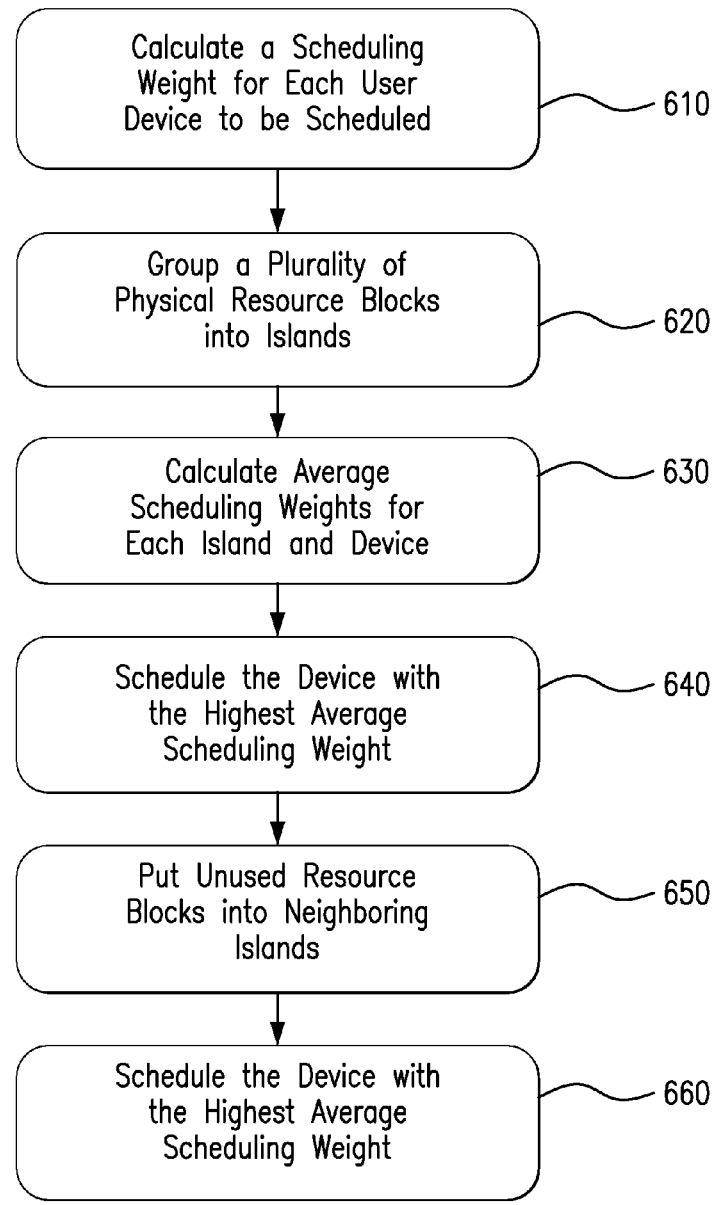
FIG. 6 is a flow chart illustrating a process for allocating spectrum resources in accordance with exemplary embodiments of the present invention.

Referring to FIG. 6, a flow chart is provided, which illustrates an exemplary process 600 for allocating spectrum resources amongst a plurality of user devices, or scheduling entities, in a wireless communication network based on calculated scheduling entity weights in accordance with an embodiment of the present invention.

Figure 10A:
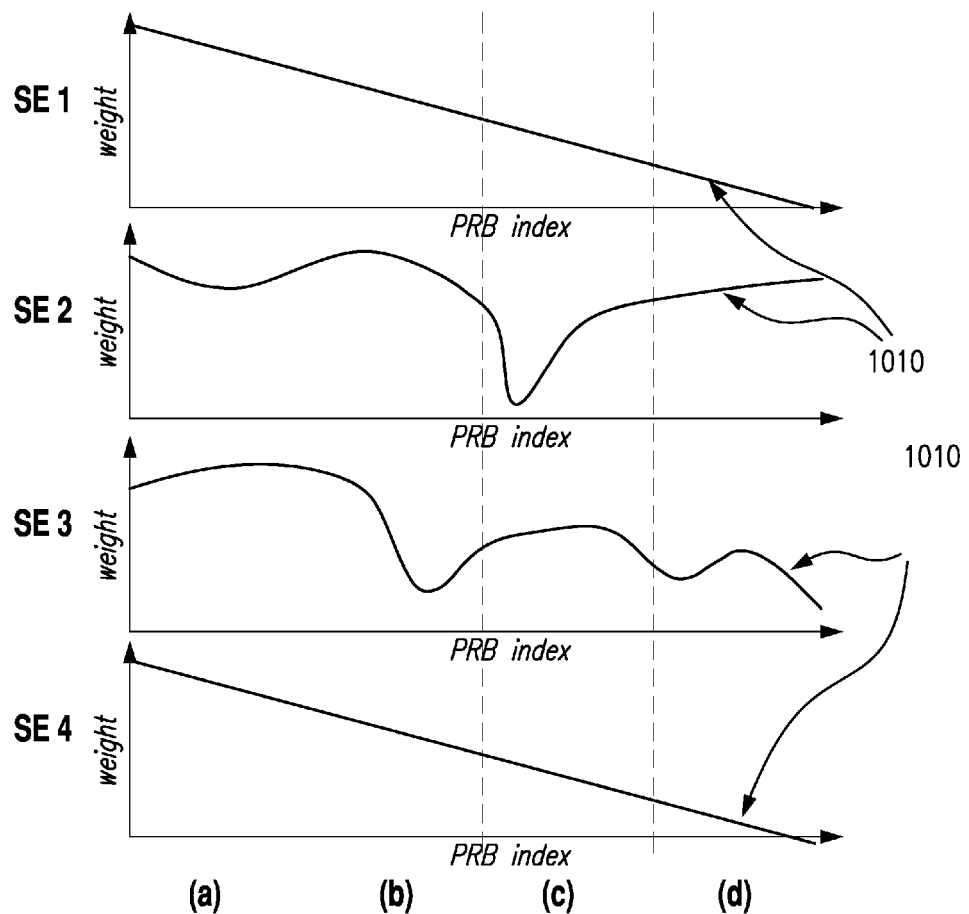
FIGS. 10A-10G illustrate a process for allocating spectrum resources in accordance with exemplary embodiments of the present invention.

In step 610, a scheduling node calculates a scheduling weight for each device that is to be scheduled. This may include, for example, calculating a weight in the time domain based on a time domain scheduling strategy and a weight in the frequency domain based on a frequency domain scheduling strategy. Exemplary time domain scheduling strategies include Round Robin and Proportional Fair, while frequency domain strategies may include Resource Fair and Frequency Selective scheduling. The resource utilization weight is another example of a frequency domain weight. FIG. 10A shows a plot of scheduling weights 1010.

According to certain embodiments of the present invention, the scheduling weight $W_{SE}$ for each scheduling entity may be a combination of a time domain weight and a frequency domain weight for a given island. For instance, $W_{SE}$ may be defined as $$W_{SE} = W_T + W_{island} \quad \text{(VIII)}$$

where $W_T$ is a time domain weight and $W_{island}$ is a frequency domain weight based, at least in part, on resource utilization weight. For instance, the island weight may be defined as the sum of an average PRB weight of an island and a resource utilization weight. Accordingly, a positive value for the resource utilization weight would increase the overall scheduling weight, while a negative value for the resource utilization weight would reduce the overall scheduling weight. $W_T$ may be based on time domain scheduling strategies translated into weight functions. For instance, the value of $W_T$ may be based on bit rates or channel quality and various quality of service parameters such as priority and delay budget.

In step 620, the available physical resource blocks (PRBs) are grouped into islands. For example, as shown in FIG. 10A, the PRBs may be grouped into four islands: (a), (b), (c), and (d).

In step 630, the scheduler calculates the average scheduling weight 1020 for each island of each device.

Figure 10B:
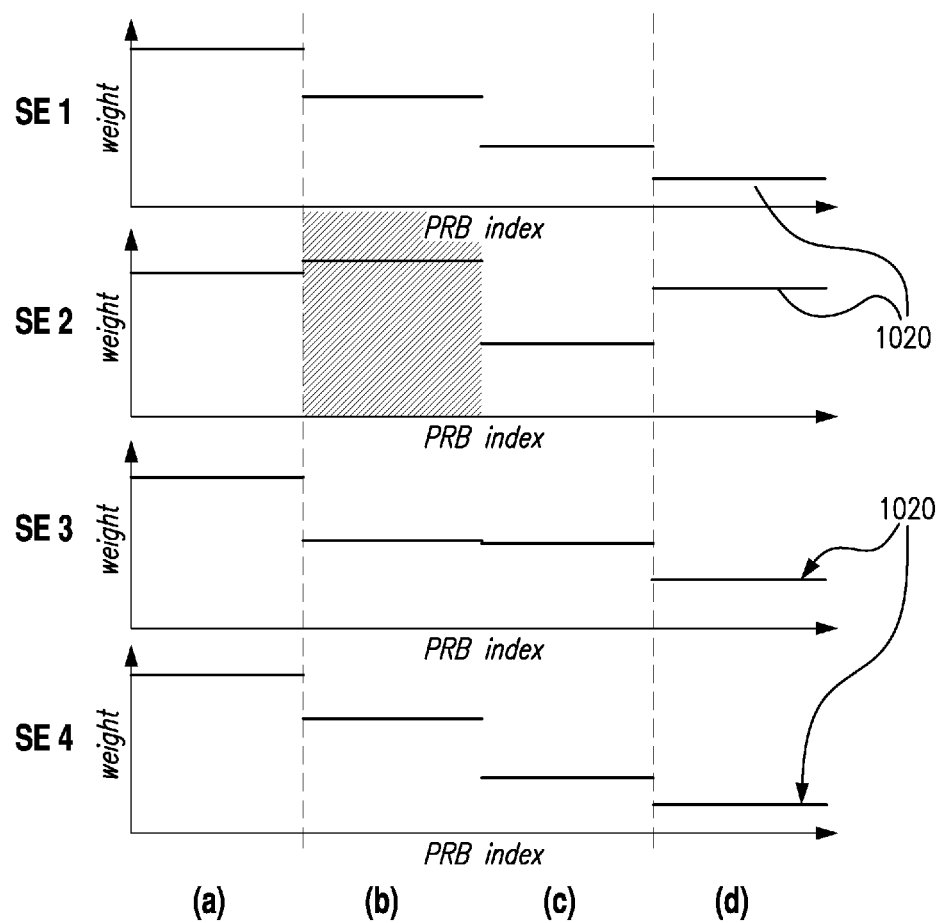
Figure 10C:
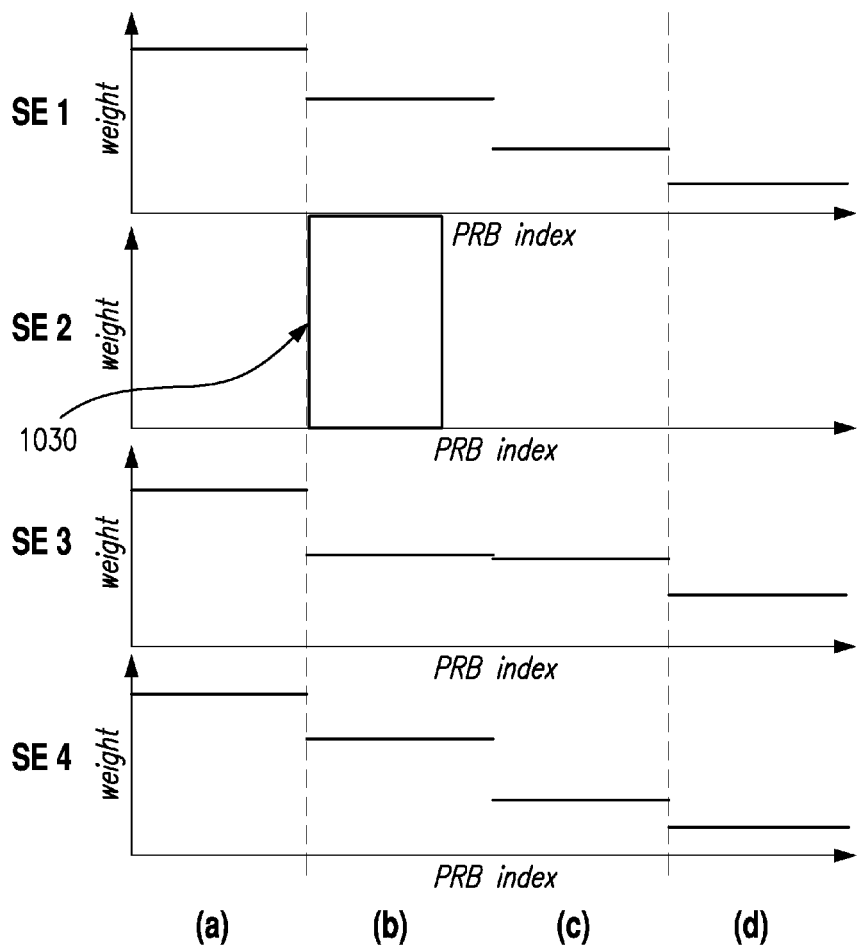

In step 640, the device with the highest average scheduling weight is scheduled. In the example of FIG. 10B, this is device SE 2. As shown in FIG. 10C, the necessary amount of resource blocks to schedule SE 2 1030 is less than the total island size. Accordingly, the remaining resource blocks may be allocated to another scheduling entity.

Figure 10D:
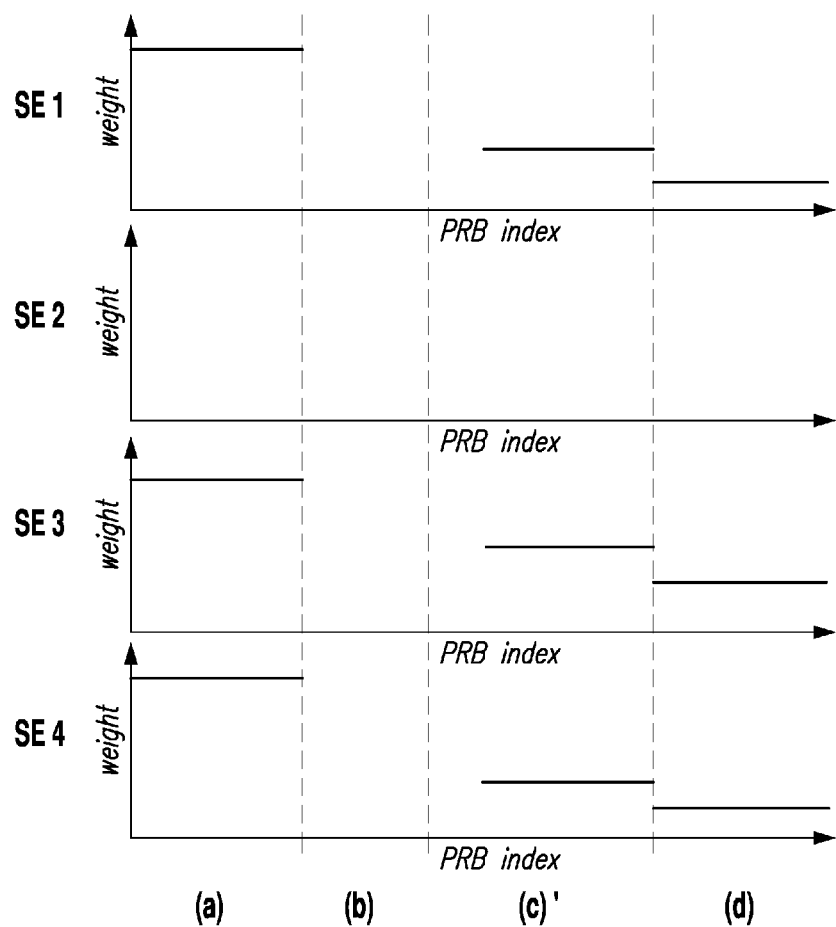
Figure 10E:
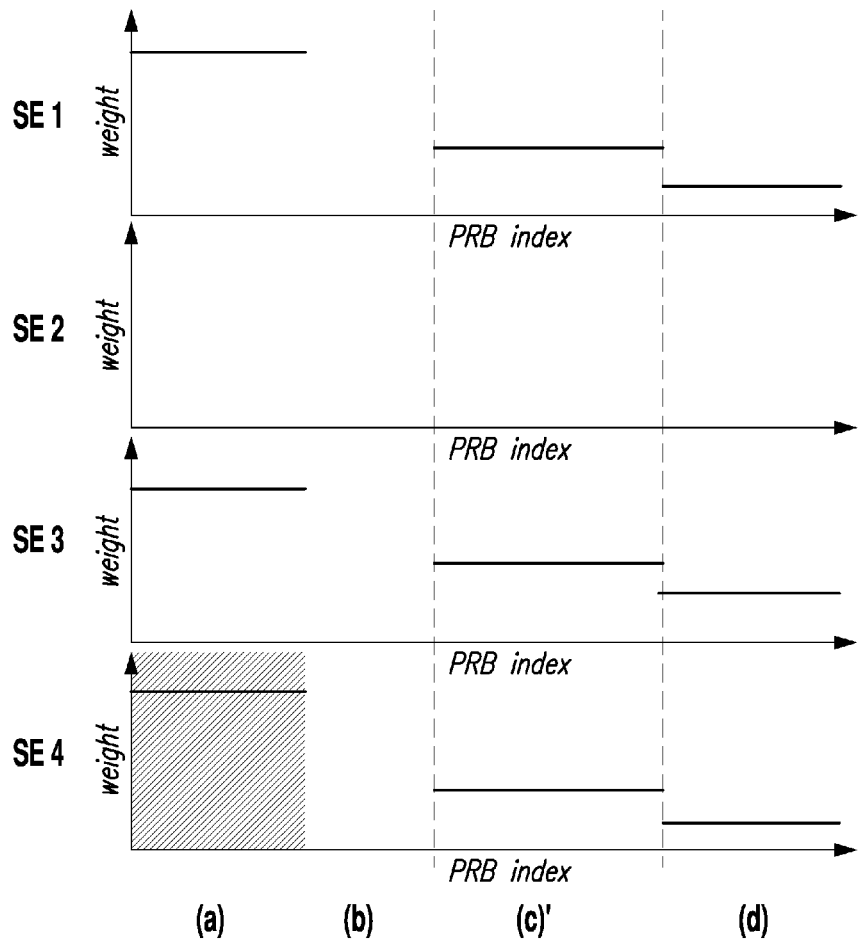

In step 650, the unused resource blocks of island (b) and device SE 2 are put into the neighboring island, (c). The newly formed grouping of resource blocks is shown as (c)' in FIG. 10D. The average scheduling weight for each remaining island is then re-calculated, as shown in FIG. 10E.

Figure 10F:
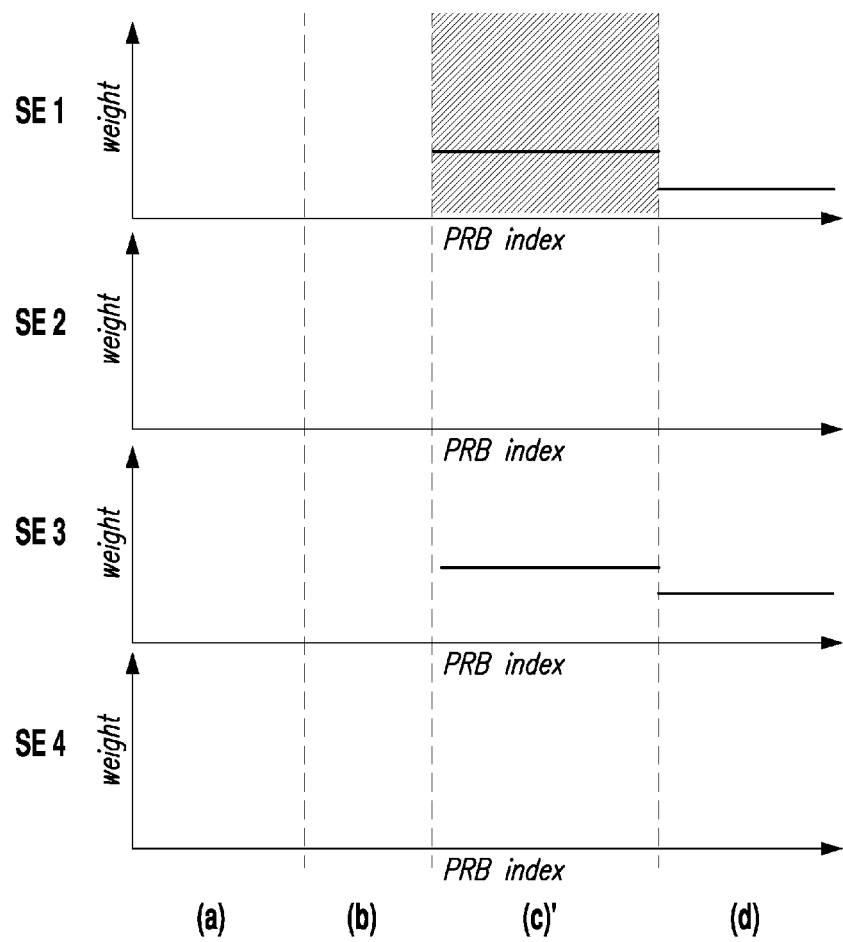
Figure 10G:
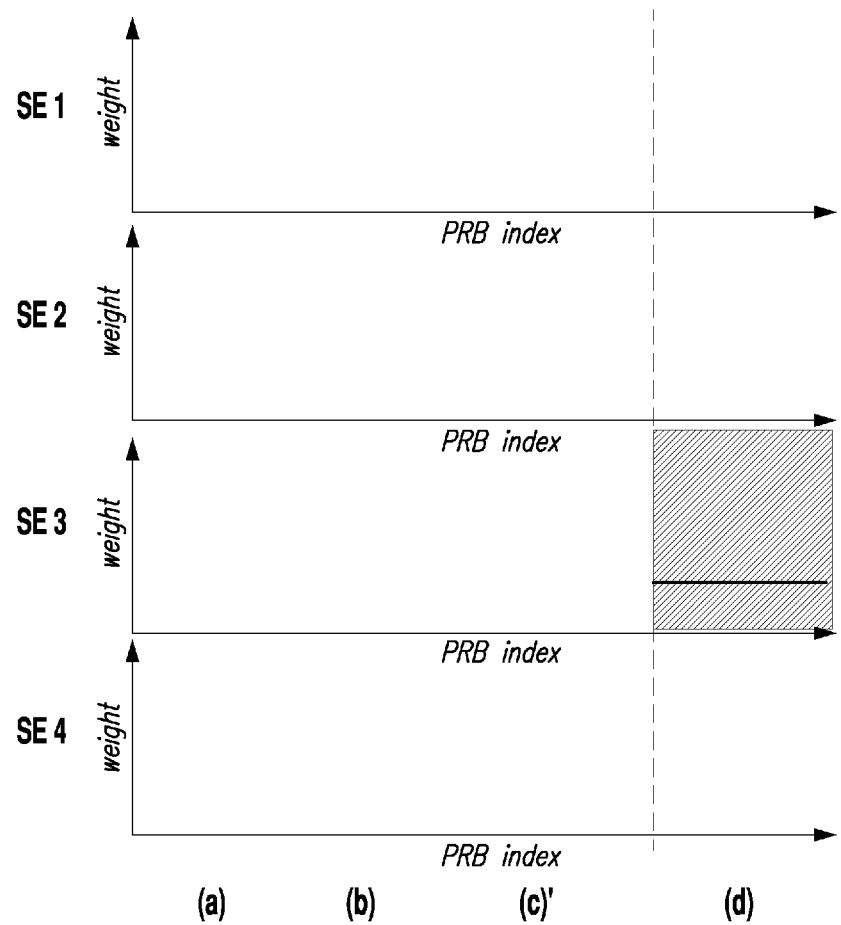

In step 660, the device with the highest average scheduling weight is scheduled. In the example of FIG. 10E, this is SE 4. The above steps may then be repeated as necessary in order to schedule all devices according to average scheduling weight. This process is shown in FIGS. 10F and 10G, wherein SE 1 and SE 3 are subsequently scheduled.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A scheduling method for allocating spectrum resources among a plurality of devices in a wireless communication network, comprising:

determining a first estimated required number of resource blocks ($N_{RB1}$) for a first device of said plurality of devices;

determining a second estimated required number of resource blocks ($N_{RB2}$) for a second device of said plurality of devices;

calculating a first utilization weight associated with said first device based on $N_{RB1}$;

calculating a second utilization weight associated with said second device based on $N_{RB2}$; and allocating spectrum resources among said first and second devices based on said first and second utilization weights, wherein determining $N_{RB1}$ comprises:

determining a number of resource blocks necessary to empty a buffer of said first device, determining a number of resource blocks sufficient to cause said first device to become power limited, determining if said number of resource blocks necessary to empty the buffer of said first device is less than said number of resource blocks sufficient to cause said first device to become power limited, and setting $N_{RB1}$ equal to said number of resource blocks necessary to empty the buffer of said first device in response to determining that said number of resource blocks necessary to empty the buffer of said first device is less than said number of resource blocks sufficient to cause said first device to become power limited.

2. The method of claim 1, wherein
the method further comprises receiving a power headroom report (PHR) from said first device, and
the step of determining $N_{RB1}$ comprises determining $N_{RB1}$ based on said received PHR.

3. The method of claim 2, wherein
the method further comprises transmitting one or more power commands to said first device, and
the step of determining $N_{RB1}$ comprises determining $N_{RB1}$ based on said power commands and said PHR.

4. The method of claim 1, further comprising:
receiving a buffer status report from said first device; and
calculating a transport block size (TBS) value for said first device, wherein
the step of determining $N_{RB1}$ comprises determining $N_{RB1}$ based on said TBS value.

5. The method of claim 1, further comprising:
calculating a first scheduling entity weight associated with said first device based on said first utilization weight; and
calculating a second scheduling entity weight associated with said second device based on said second utilization weight.

6. The method of claim 5, wherein the step of allocating spectrum resources comprises prioritizing said first device over said second device if said first scheduling entity weight is greater than said second scheduling entity weight.

7. A scheduling method for allocating spectrum resources among a plurality of devices in a wireless communication network, comprising:

determining a first estimated required number of resource blocks ($N_{RB1}$) for a first device of said plurality of devices;

determining a second estimated required number of resource blocks ($N_{RB2}$) for a second device of said plurality of devices;

calculating a first utilization weight associated with said first device based on $N_{RB1}$;

calculating a second utilization weight associated with said second device based on $N_{RB2}$; and allocating spectrum resources among said first and second devices based on said first and second utilization weights, wherein determining $N_{RB1}$ comprises:
determining a number of resource blocks necessary to empty a buffer of said first device,
determining a number of resource blocks sufficient to cause said first device to become power limited,
determining if said number of resource blocks necessary to empty the buffer of said first device is less than said number of resource blocks sufficient to cause said first device to become power limited, and
setting $N_{RB1}$ equal to the to the product of a multiplier and said number of resource blocks sufficient to cause said first device to become power limited in response to determining that said number of resource blocks necessary to empty the buffer of said first device is not less than said number of resource blocks sufficient to cause said first device to become power limited.

8. The method of claim 7, wherein said multiplier is an approximation parameter based on a signal to interference plus noise ratio value.

9. A scheduling method for allocating spectrum resources among a plurality of devices in a wireless communication network, comprising:
determining a first estimated required number of resource blocks ($N_{RB1}$) for a first device of said plurality of devices;
determining a second estimated required number of resource blocks ($N_{RB2}$) for a second device of said plurality of devices;
calculating a first utilization weight associated with said first device based on $N_{RB1}$;
calculating a second utilization weight associated with said second device based on $N_{RB2}$; and
allocating spectrum resources among said first and second devices based on said first and second utilization weights, wherein calculating the first utilization weight associated with said first device comprises calculating a maximum allocation size approximation for said first device, wherein said first utilization weight is based on $N_{RB1}$ and said maximum allocation size approximation.

10. A scheduling node for allocating spectrum resources among a plurality of devices in a wireless communication network, comprising:
a transmitter; and
a processor coupled to said transmitter, wherein said processor is configured to:
determine a first estimated required number of resource blocks ($N_{RB1}$) for a first device of said plurality of devices,
determine a second estimated required number of resource blocks ($N_{RB2}$) for a second device of said plurality of devices,
calculate a first utilization weight associated with said first device based on $N_{RB1}$,
calculate a second utilization weight associated with said second device based on $N_{RB2}$, and
allocate spectrum resources among said first and second devices based on said first and second utilization weights,
wherein said processor is configured to determine $N_{RB1}$ by:
calculating a number of resource blocks necessary to empty a buffer of said first device,
calculating a number of resource blocks sufficient to cause said first device to become power limited,
determining if said number of resource blocks necessary to empty the buffer of said first device is less than said number of resource blocks sufficient to cause said first device to become power limited, and
setting $N_{RB1}$ equal to said number of resource blocks necessary to empty the buffer of said first device in response to a determination that said number of resource blocks necessary to empty the buffer of said first device is less than said number of resource blocks sufficient to cause said first device to become power limited.

11. The scheduling node of claim 10, further comprising:
a receiver coupled to said processor,
wherein said receiver is configured to receive a power headroom report (PHR) from said first device and $N_{RB1}$ is based on said received PHR.

12. The scheduling node of claim 11, wherein
said transmitter transmits a plurality of power commands to said first device, and
said processor is configured to determine $N_{RB1}$ based on at least one of said power commands and said PHR.

13. The scheduling node of claim 10, further comprising a receiver coupled to said processor and configured to receive a buffer status report from said first device, wherein said processor is configured to:
calculate a transport block size (TBS) value for said first device based on said buffer status report; and
determine $N_{RB1}$ based on said TBS value.

14. The scheduling node of claim 10, wherein said processor is configured to:
calculate a first scheduling entity weight associated with said first device based on said first utilization weight, and
calculate a second scheduling entity weight associated with said second device based on said second utilization weight.

15. The scheduling node of claim 14, wherein said processor is configured to:
prioritize said first device over said second device if said first scheduling entity weight is greater than said second scheduling entity weight.

16. A scheduling node for allocating spectrum resources among a plurality of devices in a wireless communication network, comprising:
a transmitter; and
a processor coupled to said transmitter, wherein said processor is configured to:
determine a first estimated required number of resource blocks ($N_{RB1}$) for a first device of said plurality of devices,
determine a second estimated required number of resource blocks ($N_{RB2}$) for a second device of said plurality of devices,
calculate a first utilization weight associated with said first device based on $N_{RB1}$,
calculate a second utilization weight associated with said second device based on $N_{RB2}$, and
allocate spectrum resources among said first and second devices based on said first and second utilization weights,
wherein said processor is configured to determine $N_{RB1}$ by:
calculating a number of resource blocks necessary to empty a buffer of said first device,
calculating a number of resource blocks sufficient to cause said first device to become power limited,
determining if said number of resource blocks necessary to empty the buffer of said first device is less than said number of resource blocks sufficient to cause said first device to become power limited, and setting $N_{RB1}$ equal to the product of a multiplier and said number of resource blocks sufficient to cause said first device to become power limited in response to a determination that said number of resource blocks necessary to empty the buffer of said first device is not less than said number of resource blocks sufficient to cause said first device to become power limited.

17. The scheduling node of claim 16, wherein said multiplier is an approximation parameter based on a signal to interference plus noise ratio value.

18. A scheduling node for allocating spectrum resources among a plurality of devices in a wireless communication network, comprising:

a transmitter; and a processor coupled to said transmitter, wherein said processor is configured to:

determine a first estimated required number of resource blocks ($N_{RB1}$) for a first device of said plurality of devices;

determine a second estimated required number of resource blocks ($N_{RB2}$) for a second device of said plurality of devices;

calculate a maximum allocation size approximation for said first device; and calculate a first utilization weight associated with said first device based on $N_{RB1}$ and said maximum allocation size approximation, calculate a second utilization weight associated with said second device based on said $N_{RB2}$, and allocate spectrum resources among said first and second devices based on said first and second utilization weights.

* * * * *

UNITED STATES PATENT AND TRADEMARK OFFICE
CERTIFICATE OF CORRECTION

| | | |
|---|---|---|
| PATENT NO. | : 8,797,983 B2 | Page 1 of 1 |
| APPLICATION NO. | : 13/343992 | |
| DATED | : August 5, 2014 | |
| INVENTOR(S) | : Sun | |

It is certified that error appears in the above-identified patent and that said Letters Patent is hereby corrected as shown below:

In the Specification

In Column 6, Line 36, delete "my be" and insert -- may be --, therefor.

In the Claims

In Column 11, Line 12, in Claim 7, delete "to the to the product" and insert -- to the product --, therefor.

Signed and Sealed this
Twenty-sixth Day of May, 2015

Michelle K. Lee
*Director of the United States Patent and Trademark Office*